Patented Sept. 28, 1937

2,094,263

UNITED STATES PATENT OFFICE 2,094,263

METHOD OF PRESERVING RUBBER

Albert M. Clifford, Stow, Ohio, assignor to Wingfoot Corporation, Wilmington, Del., a corporation of Delaware No Drawing. Application July 25, 1934,
Serial No. 736,968

11 Claims. (Cl. 18—50)

This invention relates to the retarding of the ageing of rubber; more particularly, to the use in rubber, balata, gutta percha, and other rubber-like materials of age retarders of the kind hereinafter set forth. The substances to which the invention relates are new in themselves and have been found to protect against deterioration from such influences as heat, light and oxygen. They have also been found to materially enhance the resistance of rubber to deterioration by flexing. In general, they accomplish various desirable ends, among them, that of imparting improved tensile strength to the treated rubber product.

It has heretofore been observed that certain aromatic hydroxy compounds such as phenol and beta naphthol when condensed with amines produce compounds which, upon their incorporation in unvulcanized rubber, improve the ageing properties of the resulting rubber product. Typical of such materials are the compounds disclosed in United States Patents Nos. 1,781,306 and 1,763,615. Such materials before being used have always been purified to such an extent that generally only one cyclic compound remains in the product which is employed as the age retarder.

This invention resides in the discovery that the composite products obtained by condensing primary aromatic amines with alkyl substituted mono hydroxy aromatic compounds in the manner hereinafter described constitute unusually satisfactory age retarders for rubber. While the constitution of the composite products of the invention is not entirely known, the composite products in question have been found to consist of a mixture of materials in which a number can be definitely identified. Where, for example, the primary aromatic amine employed in the reaction may be represented by the formula R—NH₂ and the alkyl substituted monohydroxy aromatic compound by the formula R'—OH wherein R' comprises an alkyl substituted aromatic radical, three of the principal materials embraced by the composite reaction product can be shown to have the structural formulae (1) R—NH—R, (2) R'—NH—R' and (3) R—NH—R'. Other products which probably form are tertiary amines of the formula

Also, some of the ammonia produced in the reaction is believed to react with the hydroxy compound to give primary, secondary and possibly tertiary amines. Further, in certain cases the hydroxy compound is converted to an ether.

In the case of commercially available alkyl-substituted hydroxy aromatic compounds, such as commercial xylenols and commercial cresol or cresylic acid as it is often called, these products in themselves are complex mixtures. For example, there are available various grades of cresylic acid covering various distillation ranges, all of which are mixtures comprised of the isomeric cresols, and various xylenols. The "commercial xylenols" likewise are mixtures containing the isomeric cresols, a larger proportion of isomeric xylenols and still higher alkyl substituted derivatives. It is obvious, therefore, that for each individual hydroxy compound present in such mixtures, amine condensation products therewith will contain each of the various types enumerated above.

It is believed that other high molecular condensation products of unknown constitution also form. In general, composite reaction products containing large proportions of the products represented by formulae (1), (2) and (3) are preferred. While the reaction splits out some ammonia, the principal reaction is the removal of the hydroxy group from the alkyl substituted hydroxy aromatic compound in the form of water, a hydrogen atom from the amine supplying the necessary hydrogen to form the water.

It is preferable to remove from the composite products any small amounts of inorganic impurities and the larger part of any of the more volatile primary amines that may be present. The removal of these primary amines is especially desirable in case the product is to be employed in vulcanizable rubber compositions containing substituted or unsubstituted mercaptan accelerators, as primary amines generally exert a pronounced activating effect on such accelerators. The precise manner of removal of inorganic impurities and the more volatile primary amines may be any known to the art. In the case of the more volatile primary amines, either steam distillation of the composite product or extraction with a dilute acid such as dilute hydrochloric acid will in general be found to be suitable.

In preparing the composite products of the present invention, it is necessary to effect a condensation reaction with the attendant splitting off of water. For best results, it is desirable to employ a small amount of a suitable condensation catalyst, generally in amounts from 0.1% to 1.0%, although larger quantities may be employed in certain cases. It is not invariably necessary that a catalyst be employed, particularly if relatively high temperatures are used. The reaction is most efficiently carried out in a closed vessel and thus at superatmospheric pressures, although this feature likewise may be eliminated in certain instances. The temperatures required are upwards of 200° C. and generally in the neighborhood of 300–350° C. The time of reaction will vary somewhat, but in nearly all cases a period of more than five hours is necessary and sometimes as much as twenty-five hours.

The proportions of the reactants may be varied greatly although the products prepared from reactants in which the proportion of two mols of the primary aromatic amine to five mols. of the alkyl substituted monohydroxy aromatic compound have been found quite satisfactory. However, products in which the proportions are just reversed, namely, two mols. of alkyl substituted monohydroxy aromatic compound to five mols. of primary aromatic amine have also been found quite satisfactory. Products prepared from various other proportions of the reactants have also been found satisfactory. In fact, those prepared from as high as ten mols of the primary aromatic amine for each mol. of the monohydroxy alkyl substituted aromatic compound have also been found to constitute very satisfactory age retarders. Similarly products prepared from as high as ten mols. of the alkyl substituted monohydroxy aromatic compound for each mol. of the primary aromatic amine have also been quite satisfactory.

The invention will be more fully described in and by the following illustrative examples.

Example 1

To 540 parts by weight (5 mols.) of mixed cresols, commercially known as cresylic acid and comprising a mixture of o-, m- and p-cresols, boiling at 190–215° C. at a pressure of 735 mm. are added 163 parts by weight (1.5 mols.) of paraphenylene diamine and 50 parts by weight of zinc chloride. The mixture is heated in an autoclave for a period of approximately 12 hours and 40 minutes at a temperature of 300–310° C. and at a pressure which rises to 650 pounds per square inch during the reaction. The product is subjected to steam distillation whereupon approximately 316 grams of material (principally unreacted cresols) are distilled off. The residue in the still is taken up in benzene and poured into alcohol. 14.6 parts by weight of crystals are filtered off and discarded. The filtrate is then distilled to remove solvents and the residual product is distilled under reduced pressure. The portion boiling at 115–201° C. at 13 mm. pressure constitutes the composite product of the invention.

Example 2

To 216 parts by weight (2 mols.) of mixed cresols boiling at 190–215° C. at a pressure of 735 mm. are added 465 parts (5 mols.) of aniline and 3.5 parts of zinc chloride. The mixture is heated in an autoclave for a period of 18 hours at a temperature of approximately 340° C. The resulting mass is purified by stirring it thoroughly in approximately 1000 parts of water, after which the oily residue is distilled. The fraction collected between 135° C. and 195° C. at a pressure of 12 mm., in an amount of 121 parts and in the form of an amber colored oil constitutes the composite product of the invention.

Example 3

A composite mass of the products from six runs of the cresols-aniline reaction product similar to that prepared as described in Example 2 was fractionally distilled, that portion boiling between 185 and 255° C. at 55 mm. pressure being obtained in a 77.5% yield and constituting the composite product of the invention.

Example 4

A mixture of 465 parts (5 mols.) of aniline, 7.9 parts of tin tetrachloride and 328 parts (2 mols.) of paratertiary amyl phenol having a boiling point of 159–160° C. at 50 mm. pressure and a freezing point of 89° C. is heated for a period of 14 hours at a temperature of approximately 340° C. The crude product is distilled, the fraction collected between 185–255° C. at 50 mm. pressure being obtained in the form of a dark green fluorescent liquid. This fraction, the composite product of the invention, is obtained in a yield of 225 parts.

Example 5

A mixture of 198 parts (1 mol.) of crude p-p' diamino diphenyl methane, 6.3 parts of tin tetra chloride and 432 parts (4 mols.) of mixed cresols is heated in an autoclave for a period of 14 hours at a temperature of 340° C. The product is then distilled, that portion boiling below 225° C. at 737 mm. pressure being discarded. The residue of approximately 240 parts is washed by treating it with 1000 cc. of water and 100 cc. of concentrated hydrochloric acid. Upon being filtered and thoroughly rewashed with water, the composite product of the invention is obtained in a yield of approximately 231 parts in the form of a dark brown, very viscous oil.

Example 6

To 244 parts (2 mols.) of mixed xylenols are added 535 parts (5 mols.) of orthotoluidine and 3.5 parts of tin tetrachloride, $SnCl_4.5H_2O$. The mixture is heated in an autoclave for a period of 12 hours at a temperature of 340° C. The product is then distilled, that portion boiling below 250° C. at atmospheric pressure being discarded. The total residue, which is the composite product of the invention, is obtained in the form of a black liquid. It is insoluble in water and soluble in benzol.

Example 7

To 375 parts (3.5 mols.) of paratoluidine are added 5.2 parts of tin tetrachloride and 151 parts (1.4 mols.) of mixed cresols, 50% of which boil at 212° C. The mixture is heated in an autoclave for a period of ten hours at a temperature of 340° C. The product is then distilled, the portion boiling between 180–250° C. at 12 mm. pressure being retained as the composite product of the invention. A yield of approximately 214 parts of a semicrystalline, soft mass is obtained.

Example 8

A mixture of 500 parts (3.5 mols.) of alpha naphthylamine, 151 parts (1.4 mols.) of mixed cresols and 6.5 parts of tin tetrachloride is heated in an autoclave for a period of approximately 12 hours at 340° C. The product is washed thoroughly with water and hydrochloric acid in order to make it faintly acid to remove the tin. It is then filtered and distilled. The product boiling above 215° C. at 12 mm. pressure is in an amount of 319 parts, is in the form of a dark brown tarry mass and constitutes the composite product of the invention.

Example 9

A mixture of 200 parts (1.4 mols.) of alpha naphthylamine, 378 parts (3.5 mols.) of mixed cresols and 5.8 grams of tin tetrachloride is heated for a period of 12 hours at a temperature of 340° C. The product is washed thoroughly with water and hydrochloric acid as in the previous example. It is then filtered and distilled. The residue boiling above 215° C. at 12 mm. pressure is in the form of a dark brown tarry mass and constitutes the composite product of the invention.

Example 10

To 200 parts (1.4 mols.) of alpha naphthylamine are added 427 parts (3.5 mols.) of mixed xylenols and 6.3 parts of tin tetrachloride. The mixture is heated for a period of 12 hours at 340° C. The product is washed thoroughly with water and sufficient hydrochloric acid to make faintly acid, filtered and distilled. The residue boiling above 215° C. at 10 mm. pressure is in the form of a black-brown tar and constitutes the composite product of the invention.

Example 11

A crude, coke oven coal tar fraction boiling between 150° C. at atmospheric pressure and 310–320° C. at 6 mm. and containing anthracene, naphthalene, phenanthrene, acenaphthene, methyl naphthalene, fluorene, etc. is nitrated with a mixture of nitric and sulphuric acids. The resulting nitro compounds are then reduced with iron filings after which the resulting amines are extracted by benzene and precipitated therefrom by dry hydrogen chloride. The hydrochlorides of the amines are filtered and digested with a dilute sodium hydroxide solution, whereupon the amines in tarry form are obtained. Upon being washed and dried, 130 parts by weight of these mixed amines are mixed with 432 parts (4 mols) of mixed cresols and 5 parts of tin tetrachloride. The mixture is heated in an autoclave for a period of 12 hours at 340° C., whereupon the product is filtered and distilled, the residue boiling above 250° C. at 734 mm. pressure being obtained in the form of a black hard tar and constituting the composite product of the invention.

It will be understood that these examples are but illustrative of the invention and that numerous other composite products of primary aromatic amines and alkyl substituted monohydroxy aromatic compounds may be similarly prepared. Another example which has been found to be a very satisfactory age retarder for rubber is that obtained by condensing five mols. of orthotoluidine with two mols. of mixed cresols in the manner previously described, the composite product of the invention being that product boiling between 170 and 225° C. at 12 mm. pressure.

Examples of hydroxy compounds which may be employed in the practice of the invention in lieu of those mentioned above are the various isomers of isopropyl phenol, ethyl phenol, n-butyl phenol, n-propyl phenol, isobutyl phenol, n-amyl phenol, isoamyl phenol, cyclohexyl phenol, cyclopentamethylene phenol, diethyl phenol, di-n-propyl phenol, di-n-butyl phenol, di-isoamyl phenol, etc.

Similarly, numerous other primary aromatic amines may be substituted for the primary amines given in the above examples. Illustrative are the xylidines, the amino phenols, the amino cresols such as o-amino m-cresol, the amino naphthols, diamino phenyl naphthyl ether, alpha furfuryl amine, tetrahydroalpha furfuryl amine, beta naphthylamine, alpha aryl tetrahydronaphthylamine, beta aryl tetrahydronaphthylamine, cyclohexyl amine, alpha alicyclic tetrahydronaphthylamine and beta methyl alpha naphthylamine. Still others are para amino biphenyl, p-p' diamino diphenyl methane, p-p' diamino ditolyl methane, 2-4-diamino diphenyl amine, p-amino diphenyl amine, 2-amino fluorene, 2-7-diamino fluorene, cumidine, benzidine, tolidine, the phenetidines, the anisidines, 3-amino acenaphthene, 1-amino 2-methyl naphthalene, di(p-amino phenyl) 2-2'-propane, meta phenylene diamine, meta toluidine, meta tolylene diamine, and the several naphthalene diamines.

Likewise instead of the condensation catalysts previously disclosed, any other such catalyst may be employed, examples being iodine, sodium bisulphate, potassium bisulphate, titanium chloride, ferric chloride, aluminum fluoride and aluminum bromide.

While the composite products of this invention are in and of themselves excellent age retarders, they may be employed, if desired, in conjunction with other materials. Also, various derivatives of these composite products have been found to be suitable age retarders. Exemplary are the nitrosamine, ketone, aldehyde, and sulphur derivatives. Illustrative of such are the following examples:

Example 12

36.5 parts of the composite product of aniline and mixed cresols boiling between 155 and 255° C. at 18 mm. pressure prepared similarly to the manner described in Example 2 are dissolved in 125 parts of ethyl alcohol. To this solution are added 20 parts of concentrated hydrochloric acid and 8.3 parts of an aqueous 36% formaldehyde solution. The mixture is allowed to stand for a short period and is then diluted with water. An oily product comprising 38 parts separates out and is washed and dried. It is in the form of a brown plastic mass.

Example 13

92 parts of the composite product of aniline and mixed cresols prepared as described in Example 3 are mixed with 32 parts of sulphur, heated to 180–185° C. and treated with .5 part of iodine. The heating is continued for a period of 12 minutes at a temperature of 185–215° C. The mixture is allowed to cool, whereupon the unreacted sulphur crystallizes out. After filtering, the composite product derivative is obtained in the form of a brown oil which is soluble in organic solvents and insoluble in water.

Example 14

The partially sulphurized derivatives of the composite products may also be employed as age retarders. In one example 92 parts of a composite product of aniline and mixed cresols are fixed with 4.8 parts of sulphur, heated to 180° C. and treated with .5 part of iodine. The heating is continued for a period of 12 minutes at a temperature ranging from 180° C. to 215° C. On cooling, the composite product derivative is a brown oil which may be employed in such form as an age retarder.

Example 15

366 parts of a composite product of mixed cresols and aniline, boiling point 185–250° C. at 50 mm. pressure, 232 parts of acetone and 1.5 parts of iodine are heated in an autoclave for a period of 20.5 hours at a temperature of 220–225° C. The crude product is subjected to distillation and that portion boiling at 200° C. at 736 mm. pressure, which comprises the composite product derivative of the invention, is obtained in approximately 384 parts.

*Example 16*

It is also possible to react the acetone directly with the amine and alkyl substituted monohydroxy aromatic compound. In one instance 372 parts (4 mols.) of aniline, 173 parts (1.6 mols.) of mixed cresols, 46.5 parts (0.8 mol.) of acetone and 5.9 parts of tin tetrachloride are heated for a period of 12 hours at a temperature of approximately 340° C. At the end of the period the pressure had risen to 900 pounds per square inch and the temperature to 347° C. The product, after cooling, was washed with water, decanted and distilled. The residue boiling above 250° C. at 740 mm. pressure is in the form of a dark brown oil and constitutes the composite product derivative of the invention.

*Example 17*

It is also possible to first react the acetone with the mixed cresols and afterwards react the resulting product with the primary amine. Thus 432 parts (4 mols.) of mixed cresols, 116 parts (2 mols.) of acetone and 5.5 parts of tin tetrachloride are heated in an autoclave for a period of 6.75 hours at a temperature of 340° C. The resulting product is cooled, whereupon 265 parts thereof are removed from the autoclave. To the mass remaining in the autoclave are added 372 parts (4 mols.) of aniline and 3.7 grams of tin tetrachloride. This mixture is heated for a period of 12 hours at 340° C. The product is then diluted with ether, filtered and fractionally distilled. That portion boiling above 250° C. at 740 mm. pressure constitutes the composite product derivative of the invention, is in the form of a dark brown oil and in a yield of 214 parts.

*Example 18*

In preparing the aldehyde derivatives of the composite products of the invention, it is also possible to first react the alkyl substituted monohydroxy aromatic compound with the aldehyde and then react the resulting product with the amine. Illustrative of this procedure is the example in which 216 parts (2 mols.) of mixed cresols are reacted at a temperature below 70° C. with 32 parts (1 mol.) of formaldehyde and a trace of hydrochloric acid. The product is a viscous amber oil. The product is believed to be mixed methylene dicresols. 115 parts (0.5 mol.) of these mixed methylene di-cresols, 465 parts (5 mols.) of aniline, and 2.9 parts of tin tetrachloride are heated in an autoclave for a period of 8 hours at 340° C. The product is filtered to remove inorganic impurities and distilled to eliminate low boiling constituents. The portion boiling above 250° C. at atmospheric pressures, constituting the composite product derivative of the invention, may be employed to good advantage for the retarding of the ageing of deteriorable hydrocarbon compositions.

*Example 19*

Another derivative of the composite products of the invention is that in which toluhydroquinone is employed. A mixture of 465 parts (5 mols.) of aniline, 216 parts (2 mols.) of mixed cresols, 6 parts of toluhydroquinone and 6.9 parts of tin tetrachloride is heated in an autoclave for a period of 12 hours at 340° C. The product is diluted with ether, filtered and distilled to eliminate low boiling constituents. The portion boiling above 250° C. at 740 mm. pressure constitutes the composite product derivative of the invention and may be employed as an age retarder as herein described.

*Example 20*

Mixtures of materials, such as toluhydroquinone, with the composite products of the invention are also satisfactory age retarders. In one example, 8 parts of toluhydroquinone are dissolved in 92 parts of the composite product of Example 3, a short period of warming aiding solution. On cooling, 5 parts of material crystallizes from the oil and is filtered off. The remainder constitutes the composite product derivative of the invention.

*Example 21*

Another composite product derivative of the invention is that in which 8 parts of thiophenyl beta naphthylamine are dissolved in 92 parts of the product of Example 3 by warming the mass. The cooled product is a greenish brown oil and constitutes the composite product derivative of the invention.

*Example 22*

The nitroso derivatives of the composite products of the invention are also excellent age retarders. One such derivative which has been found quite satisfactory is that obtained by nitrosating a composite product prepared by heating in an autoclave for a period of 18 hours at a temperature of 340° C. 465 parts of aniline, 216 parts of mixed cresols and 3.5 parts of $AlCl_3$ and eliminating by distillation the portion of the product boiling below 155° C. at 18 mm. pressure and above 205° at 18 mm. 300 parts of this composite product are dissolved in 700 parts of alcohol and treated with 205 parts of hydrochloric acid (specific gravity 1.18). The resulting solution is cooled to 0–5° C. and maintained at this temperature while 131.5 parts of sodium nitrite dissolved in 260 parts of water are added slowly thereto, meanwhile agitating the mass. The mixture after standing one half hour is diluted with one and one half times its volume of water whereupon a dark brown oily layer forms. This oily layer, which is the nitroso derivative of the composite product of aniline and mixed cresols and constitutes the composite product derivative of the invention, is separated, washed with water and dried. It then may be employed as an age retarder as hereinafter described.

The composite products of this invention and their various derivatives may be employed to advantage as age retarders for rubber. They may be employed advantageously in substantially any of the standard rubber formulae, the following being one in which they have been found to give good results.

| | Parts by weight |
|---|---|
| Extracted pale crepe rubber | 100 |
| Zinc oxide | 5 |
| Sulphur | 3 |
| Stearic acid | 1.5 |
| Hexamethylene tetramine | 1 |
| Age retarder | 1 |

Rubber samples prepared in accordance with the foregoing formula were subjected to vulcanization for varying periods of time and then tested to ascertain their physical characteristics.

One set from each type of stock was tested immediately for tensile strength and elasticity while a second set was subjected to aging in a Bierer-Davis bomb for 6 days in oxygen at 50° C. and 150 pounds per square inch. At the conclusion of the 6 day period, the samples were removed from the bomb and subjected to physical tests corresponding to those conducted upon the unaged samples.

It is evident from the following table that rubber compositions containing even small proportions of the age retarders of this invention resist deterioration remarkably well. Similar compositions not containing the age retarders, upon being subjected to corresponding tests, increase in weight in the neighborhood of 10% and lose almost all their tensile and elongation properties. The following data were obtained:

| | Original | | | | Aged | | | | Pct. wt. inc. |
|---|---|---|---|---|---|---|---|---|---|
| Cure in mins. | Ult. tens. | Max. elg. | Load kgs/cm² | | Ult. tens | Max. elg. | Load kgs/cm² | | |
| | | | 500% | 700% | | | 500% | 700% | |
| Reaction product of mixed cresols and p-phenylene diamine (Example 1) | | | | | | | | | |
| 35/285° | 95 | 870 | 12 | 34 | 102 | 780 | 17 | 63 | .07 |
| 50 | 123 | 850 | 15 | 49 | 128 | 805 | 19 | 68 | .15 |
| 70 | 140 | 775 | 22 | 120 | 135 | 725 | 29 | 112 | |
| Reaction product of mixed cresols and aniline (Example 2) | | | | | | | | | |
| 35/285° | 94 | 875 | 11 | 36 | 92 | 820 | 15 | 46 | .09 |
| 50 | 115 | 820 | 17 | 57 | 115 | 805 | 19 | 64 | .15 |
| 70 | 127 | 765 | 22 | 84 | 87 | 705 | 24 | 84 | .47 |
| Reaction product of mixed cresols and aniline (Example 3) | | | | | | | | | |
| 35/285° | 76 | 880 | 11 | 28 | 84 | 850 | 13 | 35 | .22 |
| 50 | 120 | 880 | 15 | 43 | 104 | 805 | 17 | 55 | .29 |
| 70 | 137 | 810 | 20 | 72 | 110 | 750 | 22 | 82 | .40 |
| Reaction product of p-tertiary amyl phenol and aniline (Example 4) | | | | | | | | | |
| 35/285° | 124 | 920 | 12 | 33 | 95 | 825 | 15 | 44 | .13 |
| 50 | 132 | 850 | 16 | 54 | 99 | 790 | 17 | 57 | .30 |
| 70 | 153 | 795 | 22 | 84 | 136 | 770 | 23 | 87 | .33 |
| Reaction product of mixed cresols and p-p'-diamino diphenyl methane (Example 5) | | | | | | | | | |
| 35/285° | 104 | 910 | 12 | 32 | 111 | 850 | 14 | 45 | .10 |
| 50 | 120 | 845 | 16 | 51 | 128 | 805 | 19 | 69 | .11 |
| 70 | 139 | 790 | 21 | 78 | 132 | 750 | 25 | 100 | .17 |
| Reaction product of mixed xylenols and o-toluidine (Example 6) | | | | | | | | | |
| 35/285° | 100 | 840 | 15 | 45 | 98 | 835 | 14 | 44 | .68 |
| 50 | 120 | 810 | 17 | 60 | 117 | 800 | 18 | 63 | .26 |
| 70 | 142 | 780 | 22 | 84 | 115 | 725 | 26 | 100 | .39 |
| Reaction product of mixed cresols and p-toluidine (Example 7) | | | | | | | | | |
| 35/285° | 105 | 840 | 15 | 46 | 81 | 790 | 15 | 47 | .53 |
| 50 | 123 | 825 | 18 | 59 | 104 | 805 | 15 | 53 | .39 |
| 70 | 143 | 765 | 25 | 94 | 132 | 725 | 27 | 111 | .84 |
| Reaction product of mixed cresols and alpha naphthylamine (Example 8) | | | | | | | | | |
| 35/285° | 96 | 905 | 11 | 30 | 104 | 865 | 12 | 40 | .06 |
| 50 | 113 | 745 | 20 | 88 | 126 | 800 | 18 | 66 | .12 |
| 70 | 137 | 795 | 22 | 76 | 141 | 750 | 24 | 100 | .14 |
| Reaction product of mixed cresols and alpha naphthylamine (Example 9) | | | | | | | | | |
| 35/285° | 91 | 890 | 11 | 30 | 106 | 855 | 14 | 41 | .13 |
| 50 | 109 | 770 | 19 | 71 | 115 | 740 | 24 | 90 | .16 |
| 70 | 129 | 785 | 21 | 77 | 138 | 760 | 25 | 95 | .18 |
| Reaction product of mixed xylenols and alpha naphthylamine (Example 10) | | | | | | | | | |
| 35/285° | 91 | 885 | 12 | 32 | 84 | 820 | 13 | 42 | .02 |
| 50 | 113 | 860 | 16 | 45 | 132 | 805 | 20 | 72 | .17 |
| 70 | 125 | 800 | 19 | 66 | 127 | 750 | 25 | 96 | .12 |
| Reaction product of mixed cresols and mixed amines (Example 11) | | | | | | | | | |
| 35/285° | 62 | 785 | 13 | 40 | 100 | 825 | 16 | 52 | .07 |
| 50 | 102 | 780 | 19 | 64 | 124 | 785 | 22 | 78 | .08 |
| 70 | 131 | 760 | 24 | 90 | 133 | 735 | 29 | 110 | .16 |

|  | Original | | | | Aged | | | | Pct. wt. inc. |
|---|---|---|---|---|---|---|---|---|---|
|  |  |  | Load kgs/cm² | | | | Load kgs/cm² | | |
| Cure in mins. | Ult. tens. | Max. elg. | 500% | 700% | Ult. | Max. | 500% | 700% | |

Formaldehyde derivative of mixed cresols-aniline (Example 12)

| Cure in mins. | Ult. tens. | Max. elg. | 500% | 700% | Ult. | Max. | 500% | 700% | Pct. wt. inc. |
|---|---|---|---|---|---|---|---|---|---|
| 35/285° | 95 | 900 | 12 | 30 | 76 | 850 | 12 | 31 | .14 |
| 50 | 115 | 840 | 16 | 53 | 96 | 795 | 17 | 55 | .15 |
| 70 | 130 | 800 | 20 | 71 | 86 | 725 | 21 | 74 | .25 |

Sulphur derivative of mixed cresols-aniline (Example 13)

| Cure in mins. | Ult. tens. | Max. elg. | 500% | 700% | Ult. | Max. | 500% | 700% | Pct. wt. inc. |
|---|---|---|---|---|---|---|---|---|---|
| 35/285° | 114 | 900 | 13 | 37 | 128 | 850 | 16 | 54 | .02 |
| 50 | 118 | 805 | 17 | 61 | 140 | 785 | 22 | 85 | .08 |
| 70 | 150 | 785 | 23 | 89 | 140 | 725 | 30 | 115 | .14 |

Sulphur derivative of mixed cresols-aniline (Example 14)

| Cure in mins. | Ult. tens. | Max. elg. | 500% | 700% | Ult. | Max. | 500% | 700% | Pct. wt. inc. |
|---|---|---|---|---|---|---|---|---|---|
| 35/285° | 100 | 880 | 13 | 36 | 116 | 850 | 15 | 47 | .02 |
| 50 | 117 | 825 | 17 | 55 | 122 | 795 | 18 | 67 | .12 |
| 70 | 140 | 790 | 21 | 81 | 137 | 750 | 25 | 95 | .21 |

Acetone derivative of mixed cresols-aniline (Example 15)

| Cure in mins. | Ult. tens. | Max. elg. | 500% | 700% | Ult. | Max. | 500% | 700% | Pct. wt. inc. |
|---|---|---|---|---|---|---|---|---|---|
| 35/285° | 102 | 900 | 12 | 33 | 68 | 835 | 11 | 30 | .07 |
| 50 | 129 | 845 | 17 | 55 | 87 | 790 | 16 | 50 | .51 |
| 70 | 146 | 800 | 20 | 77 | 98 | 740 | 21 | 77 | .78 |

Reaction product of mixed cresols, aniline and acetone (Example 16)

| Cure in mins. | Ult. tens. | Max. elg. | 500% | 700% | Ult. | Max. | 500% | 700% | Pct. wt. inc. |
|---|---|---|---|---|---|---|---|---|---|
| 35/285° | 115 | 865 | 14 | 46 | 96 | 820 | 14 | 48 | .04 |
| 50 | 127 | 810 | 18 | 64 | 96 | 745 | 19 | 71 | .19 |
| 70 | 140 | 750 | 27 | 104 | 116 | 715 | 27 | 108 | .35 |

Reaction product of mixed cresols and aniline acetone (Example 17)

| Cure in mins. | Ult. tens. | Max. elg. | 500% | 700% | Ult. | Max. | 500% | 700% | Pct. wt. inc. |
|---|---|---|---|---|---|---|---|---|---|
| 35/285° | 104 | 875 | 13 | 40 | 92 | 810 | 15 | 50 | .14 |
| 50 | 123 | 810 | 18 | 64 | 106 | 775 | 19 | 68 | .27 |
| 70 | 132 | 750 | 25 | 97 | 109 | 715 | 26 | 100 | .45 |

Reaction product of mixed methylene dicresols and aniline (Example 18)

| Cure in mins. | Ult. tens. | Max. elg. | 500% | 700% | Ult. | Max. | 500% | 700% | Pct. wt. inc. |
|---|---|---|---|---|---|---|---|---|---|
| 35/285° | 109 | 825 | 16 | 52 | 110 | 795 | 17 | 65 | .02 |
| 50 | 147 | 825 | 20 | 73 | 130 | 770 | 22 | 87 | .10 |
| 70 | 115 | 725 | 25 | 97 | 137 | 725 | 29 | 115 | .20 |

Reaction product of mixed cresols, toluhydroquinone and aniline (Example 19)

| Cure in mins. | Ult. tens. | Max. elg. | 500% | 700% | Ult. | Max. | 500% | 700% | Pct. wt. inc. |
|---|---|---|---|---|---|---|---|---|---|
| 35/285° | 94 | 840 | 14 | 43 | 105 | 800 | 18 | 60 | .07 |
| 50 | 115 | 820 | 17 | 58 | 111 | 765 | 21 | 76 | .15 |
| 70 | 130 | 750 | 25 | 94 | 137 | 740 | 30 | 110 | .20 |

Mixture of tolu hydroquinone and mixed cresols-aniline (Example 20)

| Cure in mins. | Ult. tens. | Max. elg. | 500% | 700% | Ult. | Max. | 500% | 700% | Pct. wt. inc. |
|---|---|---|---|---|---|---|---|---|---|
| 35/285° | 100 | 895 | 13 | 35 | 118 | 850 | 16 | 50 | .03 |
| 50 | 128 | 845 | 17 | 53 | 128 | 805 | 19 | 67 | .15 |
| 70 | 136 | 795 | 21 | 77 | 132 | 760 | 23 | 92 | .22 |

Mixture of thiophenyl beta naphthylamine and mixed cresols-aniline (Example 21)

| Cure in mins. | Ult. tens. | Max. elg. | 500% | 700% | Ult. | Max. | 500% | 700% | Pct. wt. inc. |
|---|---|---|---|---|---|---|---|---|---|
| 35/285° | 100 | 900 | 11 | 32 | 118 | 865 | 15 | 46 | .02 |
| 50 | 116 | 840 | 16 | 50 | 120 | 810 | 17 | 61 | .12 |
| 70 | 120 | 775 | 20 | 76 | 139 | 765 | 24 | 92 | .13 |

Nitroso derivative of mixed cresols-aniline (Example 22)

| Cure in mins. | Ult. tens. | Max. elg. | 500% | 700% | Ult. | Max. | 500% | 700% | Pct. wt. inc. |
|---|---|---|---|---|---|---|---|---|---|
| 35/285° | 78 | 925 | 10 | 24 | 56 | 880 | 9 | 20 | .19 |
| 50 | 102 | 825 | 15 | 48 | 90 | 795 | 15 | 49 | .15 |
| 70 | 120 | 770 | 22 | 77 | 128 | 780 | 22 | 79 | .29 |

From the foregoing it is evident that the composite products herein disclosed are highly suitable as age resisters of rubber. Not only do the products of the present invention counteract the effects of the influences of heat, light and oxygen, but they tend to impart other highly desirable qualities such, for example, as increased resistance to deterioration by flexing.

Other advantages are that by carrying out the procedure herein disclosed age retarders are obtained in an increased yield since the total usable product is two or three times the quantity of a single component. Furthermore, the composite products generally possess a lower melting point than the separate components thereof which could be obtained and therefore disperse more readily in rubber during the processing operations. Still another distinct advantage is that while a number of the individual compounds which are known to be present in the composite products possess a pronounced tendency to bloom in rubber stocks, the composite products hardly exhibit this tendency at all.

It is to be understood that as hereinafter used the term "benzenoid" embraces phenyl and naphthyl groups, which, as preferred, do or do not contain substituents, such substituents being, for example, alkyl, alkoxy and like groups. Also, by the term "rubber" it is meant to include rubber, synthetic rubber, latex, balata, gutta percha, guayule, rubber isomers, rubber conversion products and similar materials. It will be apparent that numerous changes may be made in the procedure to be followed and the chemicals employed without departing from the inventive concept.

It is intended that the patent shall cover, by suitable expression in the appended claims, whatever features of patentable novelty reside in the invention.

What I claim is:

1. The process of preserving rubber which comprises incorporating therein a composite product obtained by condensing a primary aromatic amine with mixed cresols while splitting off water.

2. The process of preserving rubber which comprises incorporating therein a composite product obtained by condensing aniline with mixed cresols while splitting off water.

3. An age-resisting rubber composition comprising rubber and a composite product obtained by reacting in a closed vessel at a temperature of at least 200° C. for a period of at least five hours aniline with mixed cresols in the presence of a condensation catalyst and removing the more volatile primary amines.

4. An age-resisting rubber composition having incorporated therein a composite product resulting from the condensation of mixed cresols with aniline while splitting off water.

5. A rubber product that has been vulcanized in the presence of a composite product resulting from the condensation of aniline with mixed cresols at a temperature of at least 200° C. for a period of at least five hours in the presence of a small amount of a condensation catalyst.

6. The process of preserving rubber which comprises incorporating therein a composite product obtained by condensing a primary aromatic amine with a material selected from the group consisting of mixed cresols and mixed xylenols while splitting off water.

7. The process of preserving rubber which comprises incorporating therein a composite product obtained by condensing a primary aromatic amine with mixed xylenols while splitting off water.

8. An age-resisting rubber composition comprising rubber and a composite obtained by condensing a primary aromatic amine with mixed cresols while splitting off water.

9. The process of preserving rubber which comprises incorporating therein a composite product obtained by reacting in a closed vessel at a temperature of at least 200° C. for a period of at least five hours aniline with mixed cresols in the presence of a condensation catalyst and removing the more volatile amines.

10. An age-resisting rubber composition comprising rubber and a composite product obtained by condensing a primary aromatic amine with a material selected from the group consisting of mixed cresols and mixed xylenols while splitting off water.

11. An age-resisting rubber composition comprising rubber and a composite product obtained by condensing a primary aromatic amine with mixed xylenols while splitting off water.

ALBERT M. CLIFFORD.